US007454904B2

(12) United States Patent
Belluschi

(10) Patent No.: US 7,454,904 B2
(45) Date of Patent: Nov. 25, 2008

(54) LAYING APPARATUS FOR CABLES, LINES, CONDUCTORS OR SUCHLIKE, AND RELATIVE LAYING METHOD

(75) Inventor: Antonio Belluschi, Treviglio (IT)

(73) Assignee: Tesmec SpA, Milan (IT)

( * ) Notice: Subject to any disclaimer, the term of this patent is extended or adjusted under 35 U.S.C. 154(b) by 20 days.

(21) Appl. No.: 11/480,506

(22) Filed: Jul. 5, 2006

(65) Prior Publication Data

US 2008/0008536 A1 Jan. 10, 2008

Related U.S. Application Data

(62) Division of application No. 10/691,699, filed on Oct. 24, 2003, now Pat. No. 7,093,433.

(51) Int. Cl.
*F16D 31/02* (2006.01)

(52) U.S. Cl. .......................................... 60/450; 60/452

(58) Field of Classification Search .................. 60/445, 60/446, 450–452

See application file for complete search history.

(56) References Cited

U.S. PATENT DOCUMENTS 2,243,139 A 5/1941 Wahlmark
3,748,857 A 7/1973 Heiser
3,788,575 A 1/1974 Boettcher et al.
4,124,817 A 11/1978 Takahashi
4,186,811 A 2/1980 Bidon
4,244,123 A 1/1981 Lazure et al.
4,454,999 A 6/1984 Woodruff
4,508,281 A 4/1985 Plater
4,510,750 A 4/1985 Izumi et al.
4,528,813 A 7/1985 Izumi et al.
4,692,063 A 9/1987 Conti
4,727,718 A 3/1988 Koopmans
4,904,115 A 2/1990 Lebreton
5,481,872 A 1/1996 Karakama et al.
5,613,361 A 3/1997 Dantlgraber et al.
6,170,262 B1 1/2001 Yoshimura et al.
6,200,176 B1 3/2001 Bowers

OTHER PUBLICATIONS

Diesel Progress North American Edition, Caterpillar's New Variable Delivery Hydraulic Pump-Brief Article, Jun. 2001 (http://www.findarticles.com/p/articles/mi_m0FZX/is_6_67/ai_76736521/print).

*Primary Examiner*—Sunil Singh
(74) *Attorney, Agent, or Firm*—Novak Druce + Quigg LLP

(57) ABSTRACT

Laying apparatus and method for cables, lines, conductors or suchlike. The apparatus comprises at least a hydraulic circuit provided with a variable delivery feed pump and with a motor connected to the feed pump in order to drive laying members for the cables and suchlike. The hydraulic circuit comprises detectors able to detect the value of pressure of the oil inside the hydraulic circuit and to compare it with a pre-determined pressure value, and valves connected to the detectors and able to reduce the delivery of the feed pump in the event that the pressure measured exceeds the pre-determined pressure value.

14 Claims, 2 Drawing Sheets

LAYING APPARATUS FOR CABLES, LINES, CONDUCTORS OR SUCHLIKE, AND RELATIVE LAYING METHOD

This is a divisional of United States patent application number 10/691,699, filed Oct. 24, 2003, now pending, incorporated herein by reference in its entirety.

FIELD OF THE INVENTION

The present invention concerns an laying apparatus for cables, lines, conductors of long-distance electric power lines, cables with fiber optics, and more in general for any type whatsoever of electric cable, either aerial or underground, of any nature whatsoever, including those for the electrification of railroads.

The present invention also concerns the method enacted by the apparatus and the laying machine using such apparatus.

BACKGROUND OF THE INVENTION

It is known that for the installation of cables, for example for telephones, railroads, high or low tension, for fiber optic communication or otherwise, arranged aerial or underground, considerable traction forces are required which may be dangerous to apply due to the accidental obstacles that can increase the normal sliding friction.

Laying operations are particularly difficult in the case of stringing cables on long-distance electric power lines.

In order to effect such operations, hydraulic winches are generally used, consisting of a thermal motor able to drive a hydraulic pump which in turn drives a respective hydraulic motor which determines the winding of the line that draws the cable.

Such known hydraulic apparatuses have a main. disadvantage, however, which is that they have a hydraulic plant regulated only by a so-called "limit valve". Such valve makes the oil re-circulate, bypassing the pump, when the working pressure in the circuit exceeds a pre-determined value which entails excessive, or in any case dangerous, traction of the cable, due to the resistance of the structure of the latter.

In known apparatuses, the working pressure of the hydraulic circuit depends on the reaction offered to the sliding of the cable itself. Therefore, in the event of a sudden and accidental obstacle to the sliding, due for example to a guide pulley seizing, the hydraulic motor slows down and therefore there is a rise in the hydraulic pressure.

Such increase in pressure is discharged onto the hydraulic motor, which thus exerts very high and dangerous traction, which can even lead to breakage of or damage to the cable being drawn.

In such operating conditions, the recirculation valve keeps the pressure at pre-determined values, thus entailing a high transformation of the mechanical power yielded by the thermal motor, in heat, to effect the recirculation of almost all the oil. Such transformation entails an overheating of the oil, however, causing it to almost totally lose its lubrication characteristics, and damaging the rubber or plastic parts, which are sensitive to heat.

These problems are even more relevant in the case of laying cables with fiber optics, which require a particular caution in use and a precise control of the axial stress load, in order to prevent them from being ruined.

One purpose of the present invention is to achieve a laying apparatus, and perfect a laying method, for cables and suchlike, which, in the event of a sudden and accidental obstacle to the sliding of the cables, does not entail an overheating of the oil due to the recirculation of the latter.

Another purpose of the present invention is to achieve an apparatus with reversible parts which can, if necessary, be used as a brake.

A further purpose is to automate the intervention to control the overheating of the oil.

The Applicant has devised, tested and embodied the present invention to overcome the shortcomings of the state of the art and to obtain these and other purposes and advantages.

SUMMARY OF THE INVENTION

The present invention is set forth and characterized in the main claim, while the dependent claims describe other characteristics of the present invention or variants to the main inventive idea.

In accordance with the aforesaid purposes, a laying apparatus for cables according to the present invention comprises at least a hydraulic circuit provided with a variable delivery feed pump, and a motor connected to the pump and able to drive laying means for the cables to be laid.

According to a characteristic feature of the present invention, detection means are associated with the hydraulic circuit that detect the value of the oil pressure inside the hydraulic circuit and compare it with a pre-determined pressure value, and valve means, connected to the detection means, able to be selectively driven to act on the delivery of the feed pump in terms of reducing it, in the event that the pressure measured by the detection means exceeds the pre-determined pressure value.

In a first form of embodiment, the detection means and the valve means are of the electronic type and comprise respectively a sensor, associated with the hydraulic circuit and connected to electronic processing means suitable to compare the value measured with the pre-determined value, and an electro-valve, governed by the electronic processing means, and able to intervene on the command members of the pump in order to vary the delivery so as to return the oil pressure below the pre-determined value.

In a second form of embodiment, the detection means and the valve means are of the hydraulic type and comprise at least an adjustable valve able to intervene on the command members of the pump in order to reduce the delivery thereof and consequently reduce the pressure of the oil circulating in the circuit.

The hydraulic valve, according to a variant, is connected in series to a second valve having a regulation function to define the threshold value that activates the intervention on the delivery of the pump.

With the apparatus according to the present invention, it is therefore possible to reduce the working pressure inside the hydraulic circuit without performing any bypass of the oil circulation, since the valve means act directly on the delivery of the feed pump of the circuit.

Such solution considerably limits the risk of the temperature of the oil rising due to the effect of blow-bys in the pipes, during the steps when the pressure is reduced along the circuit.

Moreover, in the event that the laying apparatus according to the invention is associated with machines that can be used both in active steps of winch drawing, and passive steps of braking reaction, it makes these machines suitable for a predominantly automatic use with respect to the initial contrary manual maneuvers that may be carried out.

It comes within the field of the invention that at least one bypass valve is in any case present with a safety function.

In the event that the laying machine is arranged to operate simultaneously on two or more cables, or bundles of cables, even of different type and/or size, it comes within the field of the present invention that such laying machine is provided with two or more of the laying apparatuses described above, each one associated with a respective cable or bundle of cables, so as to be able to regulate in an independent and possibly differentiated manner the individual specific thresholds of intervention.

BRIEF DESCRIPTION OF THE DRAWINGS

These and other characteristics of the present invention will become apparent from the following description of some preferential forms of embodiment, given as a non-restrictive example, with reference to the attached drawings wherein.

DETAILED DESCRIPTION OF A PREFERENTIAL FORM OF EMBODIMENT

Figure 1:
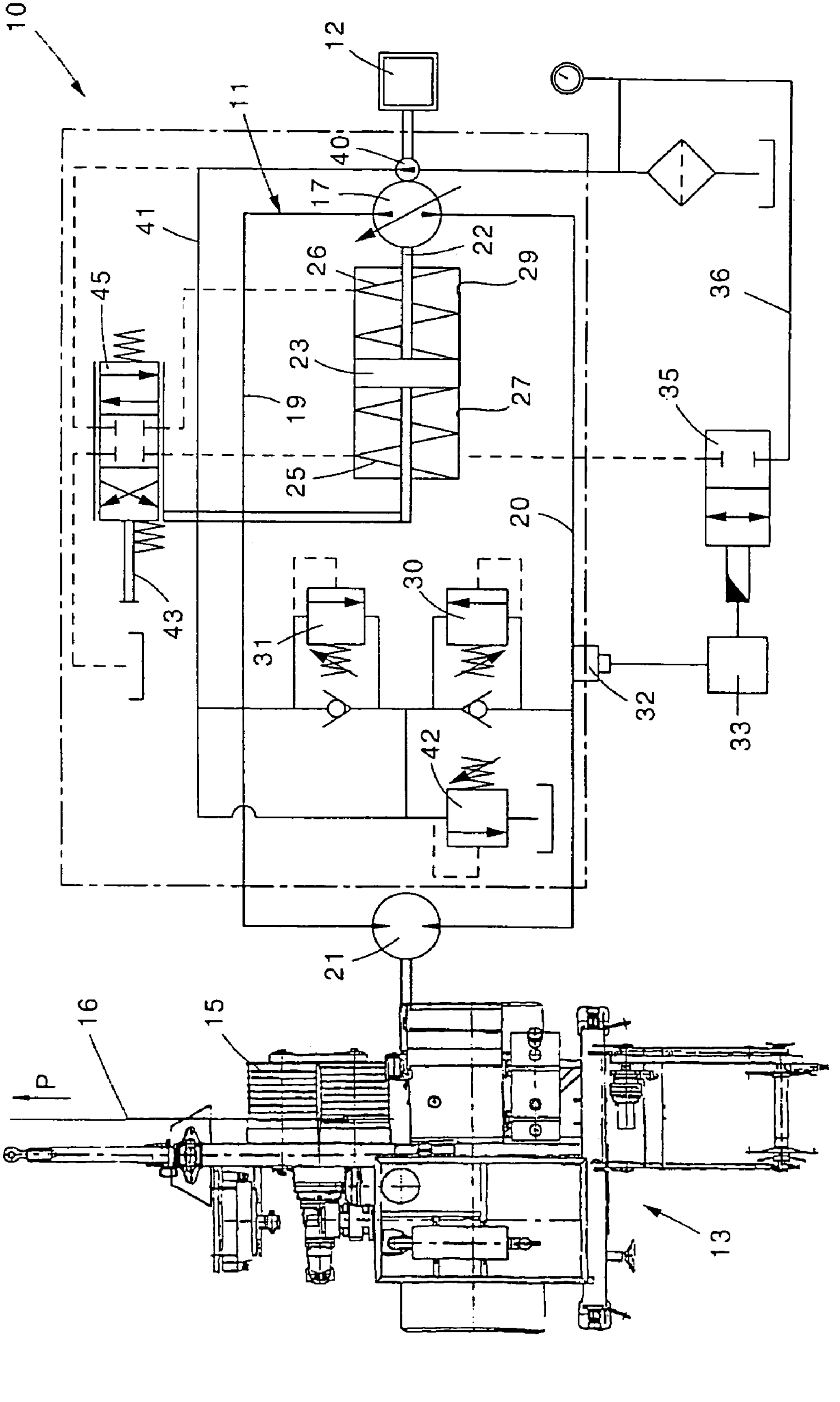
FIG. 1 is a schematic view of a first form of embodiment of a laying apparatus for electric cables according to the present invention.

With reference to the attached drawings, an apparatus 10 according to the present invention comprises a hydraulic circuit 11 activated by a thermal motor 12.

In this case, the apparatus 10 according to the invention is associated with a winch 13 provided with a reel 15 for unwinding and/or braking an electric cable 16.

The hydraulic circuit 11 comprises a variable delivery pump 17, mechanically connected to the thermal motor 12, two main pipes 19 and 20, of which one is a delivery pipe and one is a return pipe, and a hydraulic motor 21 connected to the winch 13 to determine the rotation of the reel 15.

To prevent phenomena of cavitation and sudden variations in pressure, there is a small feed pump or preloading pump 40 advantageously present, inserted in the hydraulic circuit 11 by means of a specific pipe 41 and regulated by means of its own regulation valve 42.

The hydraulic circuit 11 thus defined is of a symmetric type, and for the description of its functioning we hypothesize hereafter that the pipe 20 acts as a delivery pipe for the pressurized oil, and the pipe 19 acts as a return pipe for the oil.

The pump 17 is of the reversible type so that the function of the pipes 19 and 20 can be selectively inverted.

The variable delivery of the pump 17 is given, for example, by a command element 22 that generically can be mechanical or electric, connected to a hydraulic piston 23. It comes within the field of the invention to use variable delivery pumps of any type.

In this case, the pump 17 is of the reversible type with axial pistons and can achieve a maximum delivery in a first direction, that can be reduced to zero, and an increase in the delivery up to a maximum value in the opposite direction, according to the angular position wherein a regulation device, of a known type and not shown in the drawings, normally provided in such pump 17, is positioned.

The regulation device is able to be moved angularly by the command element 22 which in turn is moved by the hydraulic piston 23.

The hydraulic piston 23 is kept in an intermediate balanced position by two counteracting springs 25 and 26 arranged inside respective containing chambers 27 and 29.

The flow of oil inside one of the two chambers 27 or 29 defines the displacement of the piston 23 from one side or the other, and hence the command to the pump 17 to send the oil inside the pipe 19 or the pipe 20.

The possibility of displacing the hydraulic piston 23 can also be obtained with a manual command 43, acting on a distributor valve 45 capable of gradually inverting the feed to the chambers 27 and 29, and hence of varying the direction of feed of the flow of the pump 17, varying the inclination of the regulation device.

Parallel to the two pipes 19 and 20 two limit valves 30 and 31 are located symmetrically, which. provide to make the oil circulate when the hydraulic motor 21 is subjected to excessive forces, or an excessive resistance P in the traction of the electric cable 16.

The rise in pressure which consequently follows this, in fact, opens the valve 30, which makes the oil pumped by the pump 17 flow directly to the return pipe 19, thus lowering the feed pressure of the hydraulic motor 21 to values compatible with all the means employed.

The laying apparatus 10 according to the present invention allows to use the valves 30 and 32 exclusively with a safety function. In fact, in the apparatus 10 the pressure in the hydraulic circuit 11 is regulated by acting directly on the delivery of the pump 17.

In the embodiment shown in FIG. 1, such regulation of the delivery is effected using the detection made by an electronic sensor 32, able to detect an electric signal (current, tension, frequency) from which the pressure value of the oil inside the pipe 20 can be found. Such pressure value found by the sensor 32 is transmitted to an electronic processing unit 33 which has at least one memory cell in which a limit pressure value has been previously memorized.

The electronic processing unit 33 is able to compare the value measured by the sensor 32 with the limit value memorized and, if this measured value exceeds the limit value, it is able to send in turn an activation signal to an electro-valve 35.

Such electro-valve 35 is arranged so as to normally intercept a pilot pipe 36 which connects the pipe 41 to the chamber 27. When it receives the signal from the electronic processing unit 33, the electro-valve 35 opens the pipe 41 and allows a determinate quantity of pressurized oil to enter the chamber 27, so as to displace the piston 23 to one side.

As we said before, such movement of the piston 23 induces, by means of the command element 22, the angular displacement of the regulation device of the pump 17 and hence a reduction in the delivery of the latter.

Figure 2:
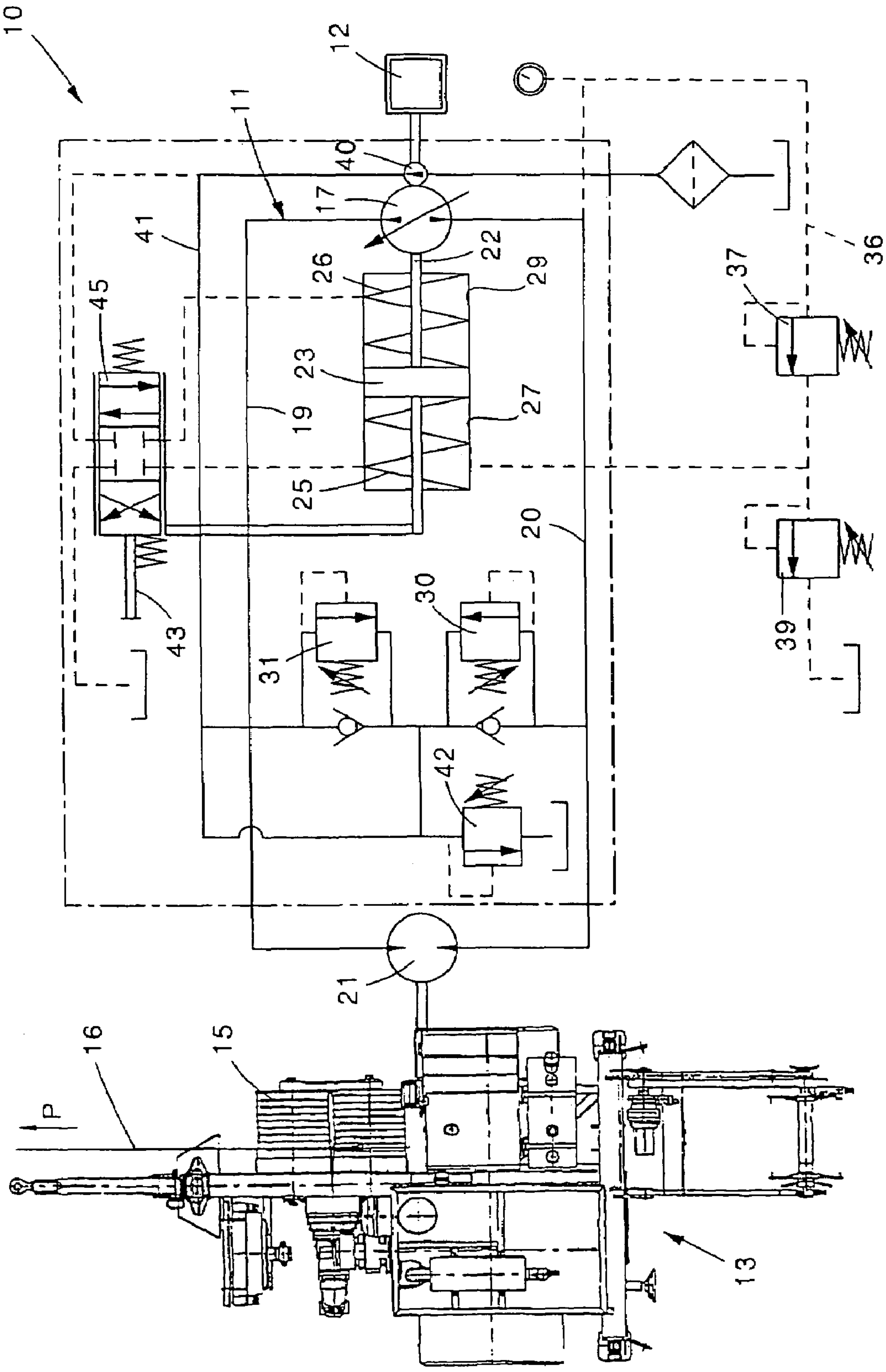
FIG. 2 is a schematic view of a second form of embodiment of a laying apparatus for electric cables according to the present invention.

In the embodiment shown in FIG. 2, the pilot pipe 36 is intercepted by a first regulation valve 37, advantageously located on a panel so as to easily set the limit pressure value. In the event that the working pressure exceeds the pre-determined value, such first regulation valve 37 allows the oil to flow into the chamber 27 and to displace the piston 23 with a pressure that depends on the regulation made on a second regulation valve 39 arranged in series with the first.

In both the solutions shown, if it is detected that the limit pressure value has been exceeded, this determines an automatic intervention to reduce the delivery of the pump 17, thus causing a reduction in the pressure in the pipe 20 and hence a consequent reduction in the force of traction exerted by the hydraulic motor 21 on the cable 16.

The intervention of the electro-valve 35, or the first regulation valve 37, predominates over the manual intervention performed by means of the distributor valve 45.

In this way, the configurations shown allow the pump 17 to operate as a motor, consequently drawing the thermal motor 12, when the hydraulic motor 21 is mechanically drawn backwards by the reel 15 by means of the traction consequent to the weight of the electric cable 16.

The reduction in delivery of the pump 17 occurs until the working pressure present inside the pipe 20 returns below the pre-determined limit value, thus automatically closing the electro-valve 35 or the first regulation valve 37.

With the apparatus 10 according to the invention we eliminate the massive recirculation of the oil, since the oil taken from the pilot pipe 36 is the minimum quantity required to move the hydraulic piston 23.

It is clear, however, that modifications and/or additions of parts may be made to the apparatus 10 as described heretofore, without departing from the field and scope of the present invention.

It is also clear that, although the present invention has been described with reference to specific examples, a person of skill in the art shall certainly be able to achieve many other equivalent forms of laying apparatus and method for cables and similar, all of which shall come within the field and scope of the present invention.

The invention claimed is:

1. Laying apparatus for cables, lines, or conductors, the laying apparatus having a hydraulic circuit comprising:

a variable delivery feed pump for pumping oil through the hydraulic circuit;

a motor, hydraulically connected to said feed pump, and able to drive laying means for laying said cables, lines, or conductors;

valve means;

detection means for measuring the pressure of the oil inside said hydraulic circuit and comparing the measured pressure with a pre-determined pressure value and sending a signal to said valve means, at least one command member of said feed pump for controlling delivery of said feed pump, and said valve means connected to said detection means and based upon the signal from the detection means able to modify operation of said hydraulic circuit by acting on said at least one command member of said feed pump which controls delivery of the feed pump to reduce the hydraulic delivery of said feed pump in the event that the pressure measured exceeds said pre-determined pressure value, a hydraulic actuator, wherein said at least one command member is mechanically connected to said hydraulic actuator kept in an intermediate position of balance by counteracting elastic means for balancing said actuator arranged inside respective containing chambers;

wherein said detection means and said valve means are of the electronic type and comprise respectively a sensor associated with said hydraulic circuit and connected to electronic processing means and an electro-valve governed by said electronic processing means and able to be selectively driven to act on the at least one command member of said feed pump to reduce the hydraulic delivery of said feed pump;

wherein said electro-valve is connected to said hydraulic actuator for sending hydraulic fluid to said hydraulic actuator in response to a signal from the detection means, a distributor valve connected to said containing chambers that axially displaces the actuator in accordance with a manual command, wherein said valve means predominates over said distributor valve in affecting the displacement of the actuator.

2. Apparatus as in claim 1, wherein:

said sensor is able to detect an electric signal that is correlated to the pressure of the oil in the hydraulic circuit, and said electronic processing means compare a value of said electric signal with a pre-determined value to determine whether the pressure threshold has been exceeded or not.

3. Apparatus as in claim 2, wherein said sensor is able to detect said electric signal, indicating an amount of tension, current or frequency, that is correlated to the pressure of the oil in the hydraulic circuit.

4. Apparatus of claim 2, wherein the detection means has means for measuring the pressure of the oil inside said hydraulic circuit and comparing the measured pressure solely with the pre-determined pressure value to generate the signal for sending to the valve means to control the valve means ability to modify the operation of the hydraulic circuit.

5. Apparatus as in claim 2, wherein said electro-valve is governed directly by said electronic processing means and able to be selectively driven to act on the at least one command member of said feed pump to reduce the hydraulic delivery of said feed pump.

6. Apparatus as in claim 1, further comprising a pre-loading pump for preventing cavitation and sudden variations in pressure inside said hydraulic circuit the pre-loading pump is the only source of pressurized oil in the circuit.

7. Apparatus of claim 6, further comprising a delivery pipe in hydraulic communication with said feed pump and motor, and a return pipe in hydraulic communication with said feed pump and motor.

8. Apparatus of claim 6, wherein the valve means is in hydraulic communication with the pre-loading pump.

9. Apparatus of claim 8, wherein the valve means intercepts a pilot pipe which hydraulically connects the pre-loading pump to one of said containing chambers.

10. Apparatus as in claim 1, wherein said feed pump is of the reversible type and is connected to said motor by two symmetrical pipes, so that each of said two pipes is functionable either as delivery pipe or return pipe.

11. Apparatus as in claim 10, further comprising two limit valves, symmetrically located parallel to said symmetrical pipes, that recirculate the oil pumped by the feed pump when said motor is subjected to excessive forces.

12. Apparatus as in claim 1, wherein:

at least one of said containing chambers is connected to said valve means, and the activation of said valve means determines the axial displacement of said hydraulic actuator for inverting the direction of pumping or reducing the hydraulic delivery of the feed pump.

13. Laying machine for cables, lines, or conductors, the laying machine comprising:

laying means, for simultaneously laying a plurality of cables, lines, or conductors, comprising a plurality of laying apparatuses as in claim 1, correlated in number to that of said plurality of cables, lines, or conductors simultaneously laid, to be able to regulate, in an independent manner each respective threshold of intervention for reducing the hydraulic delivery of the feed pump of each of the respective laying apparatuses in the event that the respective pressure measured exceeds said pre-determined pressure value.

14. Laying machine for cables, lines, or conductors, the laying machine comprising:

second laying means for simultaneously laying a plurality of cables, lines, or conductors, comprising a plurality of laying apparatuses as in claim 1, correlated in number to that of said plurality of cables, lines, or conductors simultaneously laid, wherein said second laying means regulates, in an independent manner, an individual specific threshold of intervention for reducing the hydraulic delivery of the feed pump of each of the respective laying apparatuses in the event that the respective pressure measured exceeds said predetermined pressure value.

* * * * *